United States Patent [19]

Klaus

[11] Patent Number: 5,152,006
[45] Date of Patent: Sep. 29, 1992

[54] RECEIVER CONTROLLER METHOD AND APPARATUS

[75] Inventor: Thomas R. Klaus, Palatine, Ill.

[73] Assignee: Motorola, Inc., Schaumburg, Ill.

[21] Appl. No.: 660,195

[22] Filed: Feb. 25, 1991

[51] Int. Cl.[5] .......................... H04B 1/38; H04B 1/16
[52] U.S. Cl. ...................................... 455/89; 455/343; 340/825.44
[58] Field of Search ................. 455/89, 38.3, 76, 38.1, 455/78, 343, 214, 32.1, 336; 340/825.44, 825.47, 825.48, 311.1; 370/94.1, 100.1

[56] References Cited

U.S. PATENT DOCUMENTS

| | | |
|---|---|---|
| 3,962,553 | 6/1976 | Linder et al. |
| 4,398,192 | 8/1983 | Moore et al. |
| 4,961,073 | 10/1990 | Drapac et al. ..................... 455/343 |
| 4,964,121 | 10/1990 | Moore . |
| 4,977,611 | 12/1990 | Maru . |
| 4,995,099 | 2/1991 | Davis ................................. 455/343 |
| 5,032,835 | 7/1991 | Deluca ............................... 455/343 |

Primary Examiner—Reinhard J. Eisenzopf
Assistant Examiner—Lisa Charouel
Attorney, Agent, or Firm—Kirk W. Dailey; Raymond A. Jenski

[57] ABSTRACT

A method of controlling a receiver's on-time (313). The radio receiver (109) receives radio frequency signals (309) of a predetermined duration (305) at an interval having a predetermined time period (301). The method varies the receiver's on-time (415, 417) until the data detector (205) is on the verge of failing to detect all of the data.

8 Claims, 3 Drawing Sheets

RECEIVER CONTROLLER METHOD AND APPARATUS

FIELD OF THE INVENTION

This invention generally relates to controlling the on-time of a receiver and more specifically to adaptively controlling the on-time of a radio receiver to minimize its power consumption.

BACKGROUN OF THE INVENTION

Generally, there are two ways in which radio frequency signal receivers control their power consumption in a radiotelephone. The first way is to turn the receiver on with the radiotelephone and leave it on during the entire operation. The second way is to activate the receiver in anticipation of receiving radio frequency signals of interest in an effort to reduce the amount of power consumption.

When a receiver is used in a system where radio frequency signals are transmitted at known intervals, such as in a time division multiplexed system, the receiver can know the point in time when the receiver should be active. If the receiver is synchronized with the remote transmitter, the radio receiver can be turned on in anticipation of a data signal from the transmitter and turned off after receiving the data signal from the remote transmitter. Currently, this anticipation is used in some radiotelephones, such as model #TZ803 available from Motorola, Inc.. A microprocessor external to the receiver is used to control the on-time for the receiver. The on-time must account for rise times of the components and the lock time for the frequency synthesizer. The on-time is calculated using the worst case timing analysis for the different parts of the receiver circuitry which compensates for changes in the frequency, the temperature and the component specifications.

For example, in the TZ803, a radio frequency signal containing a data frame which needs to be received can last 40 milliseconds (mS) and typically a radiotelephone would receive one of every eight frames. Therefore, the receiver including the frequency synthesizer needs to be operational for forty milliseconds, then can be off for 280 mS. The worst case lock time of the frequency synthesizer is 100 milliseconds over temperature, frequency and component tolerance. To account for the worst case timing, the frequency synthesizer is turned on 100 mS earlier than the anticipated arrival of the radio frequency signal of interest. Therefore, the frequency synthesizer is on for approximately 44% of the time. Similarly, the worst case rise time of the other receiver circuitry is 20 milliseconds, therefore, this receiver circuitry is on approximately 18% of the time. This is a savings over other radio systems in which the receiver circuitry and the frequency synthesizer are on 100% of the time, however, the worst case times which are used to calculate these turn-on times are uncommon, therefore, the frequency synthesizer and the receiver circuitry are often on for longer periods of time than is necessary. The worst case times are uncommon because they account for the theoretical extremes of operation. During a majority of the operation of the radiotelephone, the lock-times and rise times change with the changes in temperature and the frequency of the frequency synthesizer; rarely meeting the worst case times. Therefore, a need exists for an adaptive controller of the radio receiver on-time which compensates for the frequency of the receive signals, the current temperature of the radiotelephone and for the component variations of the specific receiver.

SUMMARY OF THE INVENTION

The present invention encompasses a method of controlling a receiver's on-time. The receiver includes a data detector and a frequency synthesizer and receives radio frequency signals containing data having a first predetermined duration at an interval having a second predetermined time period. The receiver's on-time is varied until the data detector is on the verge of failing to detect all of the data.

DESCRIPTION OF A PREFERRED EMBODIMENT

Figure 1:
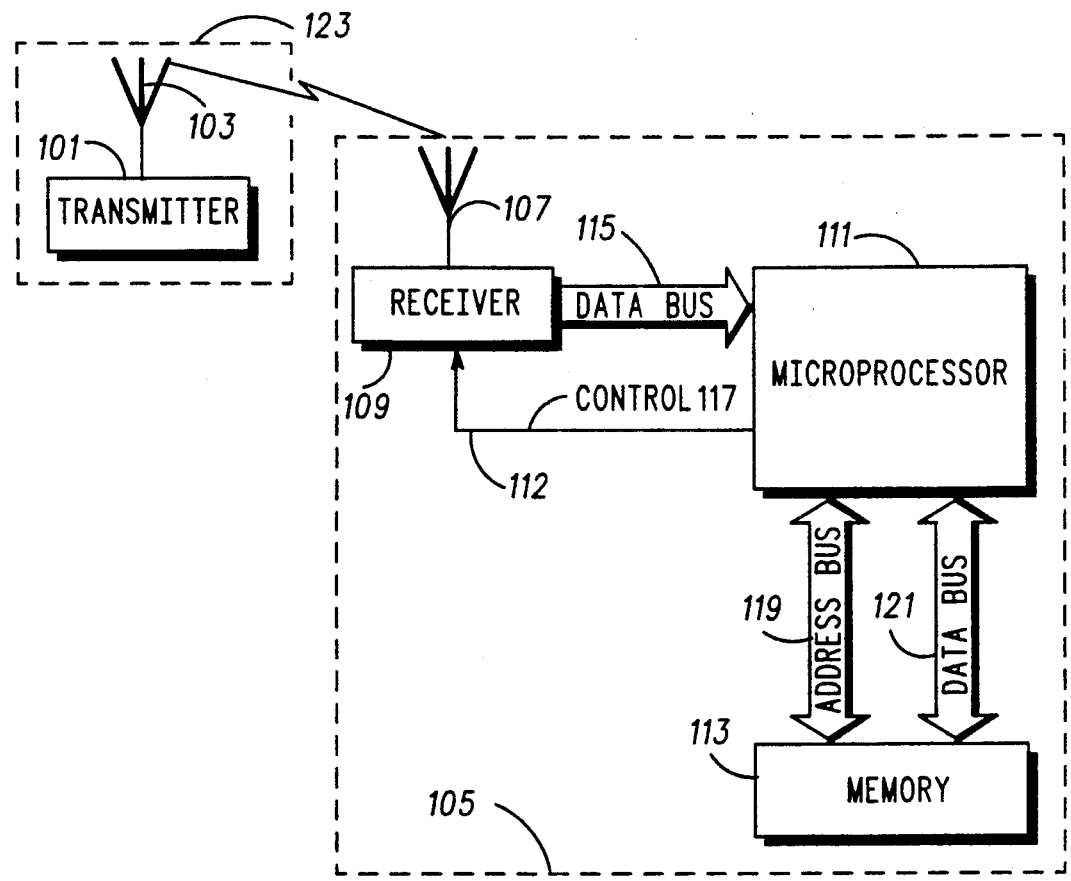
FIG. 1 is a block diagram of a data communications system which may employ the present invention.

FIG. 1 depicts a radio frequency transmission system which includes a fixed transmitter site 123 and a portable or mobile radiotelephone 105. The fixed transmitter site 123 contains an antenna 103 and a radio frequency transmitter 101. The portable or mobile radiotelephone 105 includes an antenna 107 for coupling the radio frequency signals sent from the fixed transmitter site 123, a receiver 109 for receiving and detecting data in the receive radio frequency signals, a microprocessor 111 which receives the detected data via the data bus 115 and transmits control signals via control signals 117 to the receiver 109. The control signals 117 control the on-time of the individual parts of the receiver 109. The microprocessor 111 also has external memory 113. The memory 113 is used for storage of computer data and programs which may employ the current invention. The memory 113 is coupled to the microprocessor 111 via an address bus 119 and a data bus 121.

Figure 2:
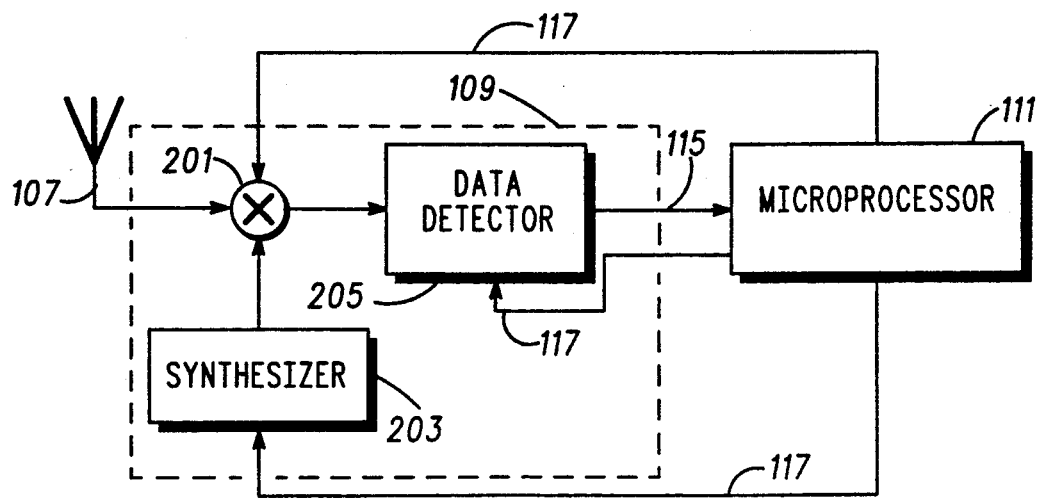
FIG. 2 is a detailed view of the receiver depicted in FIG. 1.

FIG. 2 reveals a detailed view of the receiver 109 depicted in FIG. 1. Inside the receiver 109, there is a frequency synthesizer 203 and a data detector 205. Upon reception of radio frequency signals via the antenna 107, a mixer 201 combines the incoming signals with the frequency generated from the frequency synthesizer 203. The data detector 205 transposes the output signal of the mixer 201 into a data form recognizable by the microprocessor 111. The radio transmitter 101 transmits radio frequency signals at predetermined intervals to the receiver 109 for predetermined lengths of time, therefore, the receiver 109 does not need power 100% of the time. In an effort to reduce the power consumption of the radiotelephone, the control signals 117 turn on and off the frequency synthesizer 203, the mixer 201 and the data detector 205 contained within the receiver 109.

Figure 3:
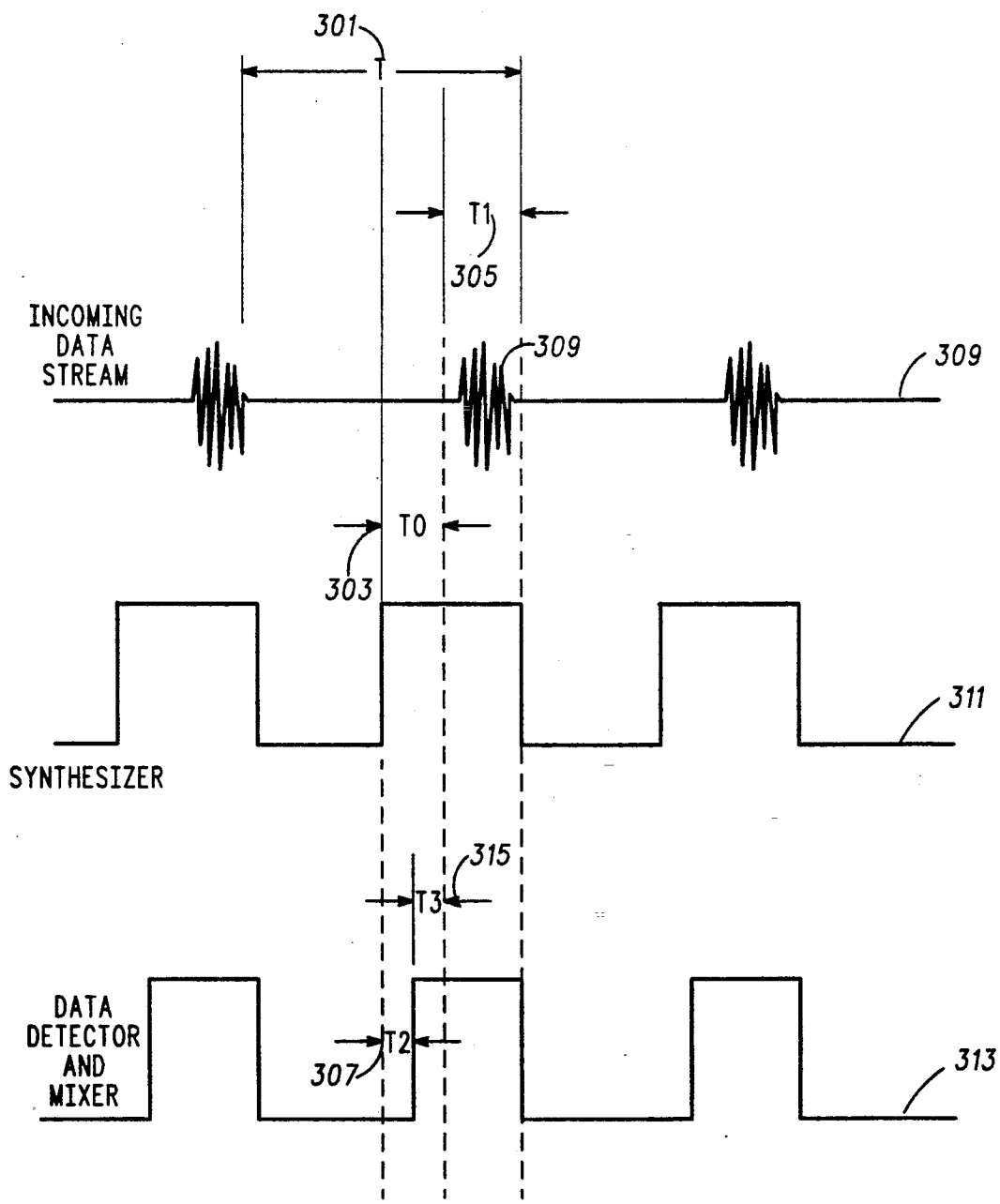
FIG. 3 is a timing diagram of the transmission of the incoming radio frequency signals and the relationship to the turn-on time of a radio receiver which may employ the present invention.

FIG. 3 is a timing diagram of the transmission of the incoming radio frequency signals from the transmitter 101 which are received by the antenna 107 and the signal's relationship to the turn-on time of the frequency synthesizer 203, the data detector 205 and the mixer 201. The first waveform 309 depicts the transmission of the radio frequency signals of interest from the transmitter 101. The parameter "T" 301 is the time interval between transmissions of radio frequency signals, in the present embodiment the time is 280 mS. Parameter "T1" 305 is the length in time of an individual transmission of radio frequency signals of interest from the transmitter 101, which in the present embodiment can be 40 mS. The second waveform 311 is a control signal created by the microprocessor 111 which turns the frequency synthesizer 203 on and off. Parameter "T0" 303 is the minimized warm-up time necessary for the frequency synthesizer to lock on to the desired frequency as determined by the method disclosed in FIG. 4. "T1"+"T0" is the receiver on-time. The third waveform 313 is a control signal created by the microprocessor 111 which switches the data detector 205 and the mixer 201 on and off. Parameter "T2" is the fixed amount of time after turning on the frequency synthesizer 203 that the data detector 205 and the mixer 201 are turned on. Parameter "T3" is the warm-up time necessary for the data detector 205 and the mixer 201 to ensure that all of circuitry contained within the data detector 205 and the mixer 201 has warmed-up prior to receiving the output signal from the antenna 107.

Figure 4:
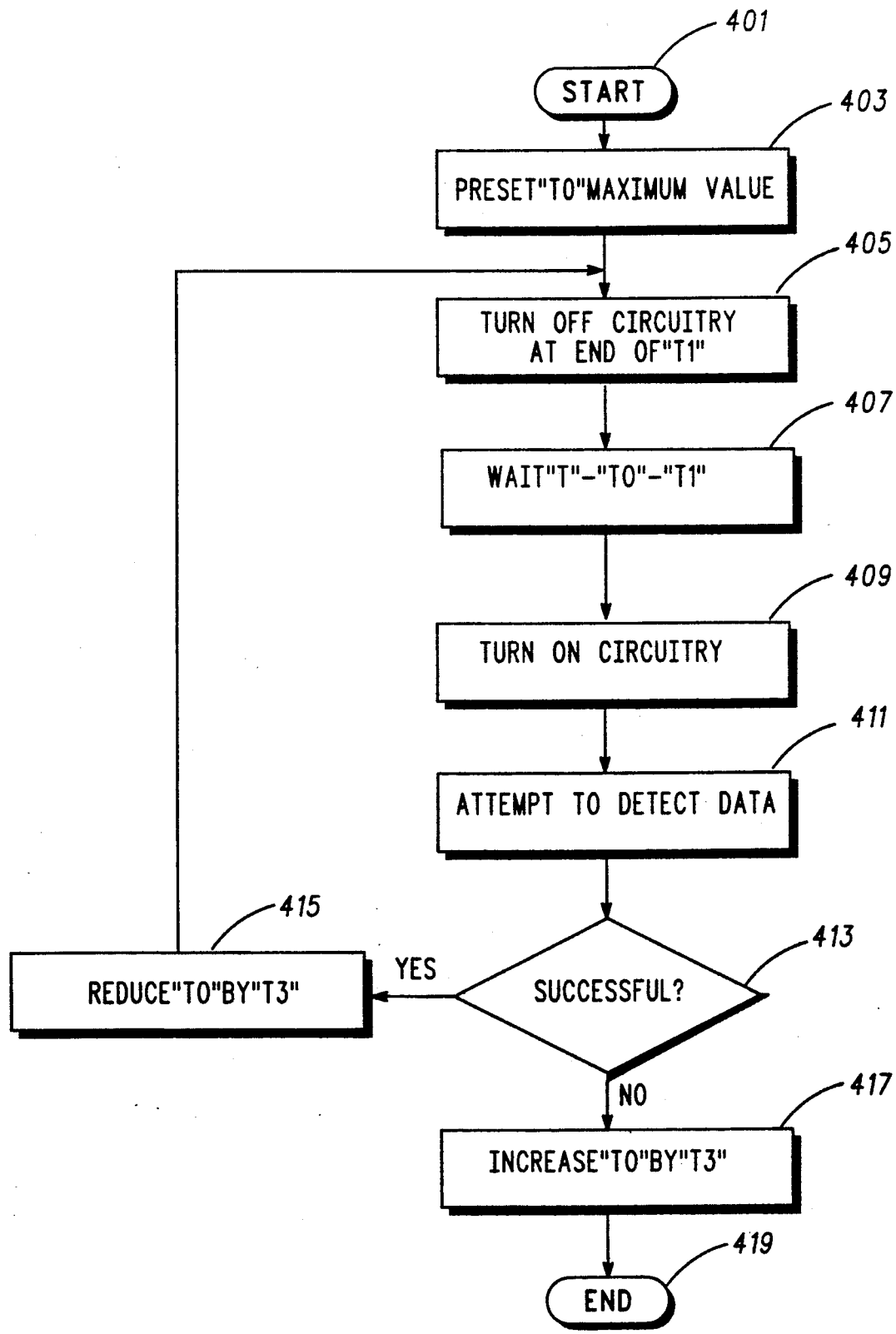
FIG. 4 is a process flow chart of a method which may employ the present invention.

The method depicted in FIG. 4 in flow chart form is an adaptive loop which controls the on-time of components of the receiver 109, such as the frequency synthesizer 203, the data detector 205 and the mixer 201. The method compensates for the frequency, the temperature at which the radio is operating and the component variation in the radio by starting the method in response to a change in the temperature of the receiver 109 or a change in the frequency of the frequency synthesizer 203. The method starts the on-time of the receiver 109, "T0"+"T1", at the predetermined worst case time, in this embodiment 142 mS, and reduces the on-time by a predetermined increment, "T3" set at 5 mS for this embodiment, until it is on the verge of not detecting all of the data. Equally efficient methods may be developed, for example, by starting at a predetermined minimum value and working out until the data detection is successful.

The method begins at 401 triggered by a measurable change in the temperature or a change in the frequency of the frequency synthesizer 203. At 403, The warm-up time parameter "T0" 307 is set to the predetermined worst case value, 142 mS. At 405, the receiver 109 is turned off at the end of "T1" 305. At 407, the method waits an amount of time equal to "T" 301 less the current setting for "T0" 303 and "T1" 305. At 409, the receiver 109 is turned on. At 411, the data detector 205 attempts to detect the data from the incoming radio frequency signals 309. At 413, the method decides if the data detection was successful or not successful by verifying the accuracy of the data detected. If it was successful, then at 415 the warm-up time parameter, "T0" 307, is reduced by a predetermined increment "T3" and the method is repeated starting at 405. These steps are repeated until data detection is not successful. If the data detection is not successful, the warm-up parameter is increased by the predetermined increment "T3", returning the warm-up time "T1" 307 to the duration of the previous successful data detection. The method ends at 419. The minimized warm-up time is now at the lower limit of successfully detecting data.

The accuracy of the method may be improved by reducing the magnitude of the predetermined increment "T3", however, this will increase the number of iterations necessary to achieve the minimized limit. In the present invention, this method was implemented for the turn-on time of the frequency synthesizer 203. The data detector 205 and the mixer 201 are turned-on a fixed time, "T2", from the turn-on time of the frequency synthesizer 203, but upon apprehending the present invention, a designer may implement this method individually for the frequency synthesizer 203, the data detector 205, the mixer 201 and any other circuitry for which it may be deemed necessary, thus, increasing the accuracy of the turn-on times and increasing the microprocessor time necessary for the implementation of the method.

What is claimed is:

1. A method of adaptively controlling a radio receiver's on-time, the receiver circuitry including a data detector, a mixer and a frequency synthesizer, and receiving a first of a plurality of radio frequency signals, the radio frequency signals being received for a first predetermined time period at intervals of a second predetermined time period, the method comprising the steps of:
   setting a first time parameter to a third predetermined time period;
   turning off the radio receiver at the end of the first time period;
   subtracting the sum of the magnitude of the first predetermined time period and the magnitude of said first time parameter from the magnitude of the second predetermined time period, forming a second time parameter;
   waiting a length of time equal to said second time parameter;
   turning on the radio receiver circuitry;
   attempting to detect data from the received radio frequency signals; and
   increasing said first time parameter by a fourth time period when data is not detected.

2. A method of adaptively controlling a radio receiver's on-time in accordance with claim 1 further comprising the step of reducing said first time parameter by the fourth time period when data is detected.

3. A method of adaptively controlling a radio receiver's on-time in accordance with claim 1 further comprising, triggering, responsive to a change from the first radio frequency to a second radio frequency, said setting said first time parameter to said third predetermined time period.

4. A method of adaptively controlling a radio receiver's on-time in accordance with claim 1 wherein said turning on the radio receiver circuitry further comprises:
   turning on the frequency synthesizer;
   waiting a length of time equal to a fifth time parameter;
   turning on the data detector; and
   turning on the mixer.

5. A radiotelephone receiver disposed within a radiotelephone, receiving radio frequency signals for a first time period at intervals of a second time period, the radiotelephone receiver comprising:
   means for setting a first time parameter to a third time period;
   means for turning off the radio receiver at the end of the first time period;

means for subtracting the sum of the magnitude of the first predetermined time period and the magnitude of said first time parameter from the magnitude of the second predetermined time period, forming a second time parameter;

means for waiting a length of time equal to said second time parameter;

means for turning on the radio receiver;

means for attempting to detect data from the received radio frequency signals; and means for increasing said first time parameter by a fourth time period when data is not detected.

6. A radiotelephone receiver in accordance with claim 5 further comprising means for reducing said first time parameter by the fourth time period when data is detected.

7. A radiotelephone receiver on-time controller for use with a digital computer disposed within a radiotelephone, the controller comprising:

a computer program storage medium having a computer program to be executed by the digital computer stored thereon, the computer program comprising:

means for processing the minimum radio reciever on-time necessary to receive radio frequency signals;

means for setting a first time parameter to a third time period;

means for turning off said radio receiver at the end of a first time period;

means for subtracting the sum of the magnitude of said first predetermined time period and the magnitude of said first time parameter from the magnitude of a second predetermined time period, forming a second time parameter;

means for waiting a length of time equal to said second time parameter;

means for turning on said radio receiver;

means for attempting to detect data from said radio frequency signals; and means for increasing said first time parameter by a fourth time period when data is not detected.

8. A radiotelephone receiver on-time controller in accordance with claim 7 wherein said computer program further comprises means for reducing said first time parameter by the fourth time period when data is detected.

* * * * *